United States Patent [19]

Katz

[11] Patent Number: 4,678,874

[45] Date of Patent: Jul. 7, 1987

[54] ANTI-BURGLARY DEVICE FOR AUTOMOBILE RADIOS AND CASSETTES

[76] Inventor: Maurice D. Katz, 35 Broadway, Lawrence, N.Y. 11559

[21] Appl. No.: 847,960

[22] Filed: Apr. 3, 1986

[51] Int. Cl.$^4$ ............................................. H01H 9/28
[52] U.S. Cl. ............................... 200/43.12; 200/43.01
[58] Field of Search .......................... 200/43.12, 43.01; 340/63, 542, 543; 455/345; 312/7.1; 180/287

[56] References Cited

U.S. PATENT DOCUMENTS

| | | | |
|---|---|---|---|
| 1,524,815 | 2/1925 | Chessman | 200/43.12 |
| 1,740,210 | 12/1929 | Tobin | 200/43.12 X |
| 1,873,484 | 8/1932 | Rosine | 200/43.12 |
| 2,170,780 | 8/1939 | Massey | 200/43.12 |
| 2,819,357 | 1/1958 | Pangborn | 200/43.12 |
| 3,760,131 | 9/1973 | Ford et al. | 200/43.12 |
| 3,774,049 | 11/1973 | Coleman | 200/43.12 |
| 4,081,751 | 3/1978 | Maddaloni | 455/154 |
| 4,248,069 | 2/1981 | Burbank | 70/160 |
| 4,331,895 | 5/1986 | Caruso | 200/43.12 |
| 4,481,512 | 11/1984 | Tscheulin et al. | 340/825.25 |

OTHER PUBLICATIONS

Nakamich, "Mobile Sound System", brochure, Feb. 1983.

Primary Examiner—Stephen Marcus
Assistant Examiner—Ernest G. Cusick

[57] ABSTRACT

A substantially totally enclosed radio-cassette car radio mountable in an automobile dashboard, by which all operative parts thereof are enclosed within the protective casing, and there being a combination lock-type set of dials of a combination lock mounted inside the protective casing operatively locking the volume knob at zero volume when the lock is in a locked state, and the connections within the protective casing preventing access thereto in absence of destroying the radio.

14 Claims, 4 Drawing Figures

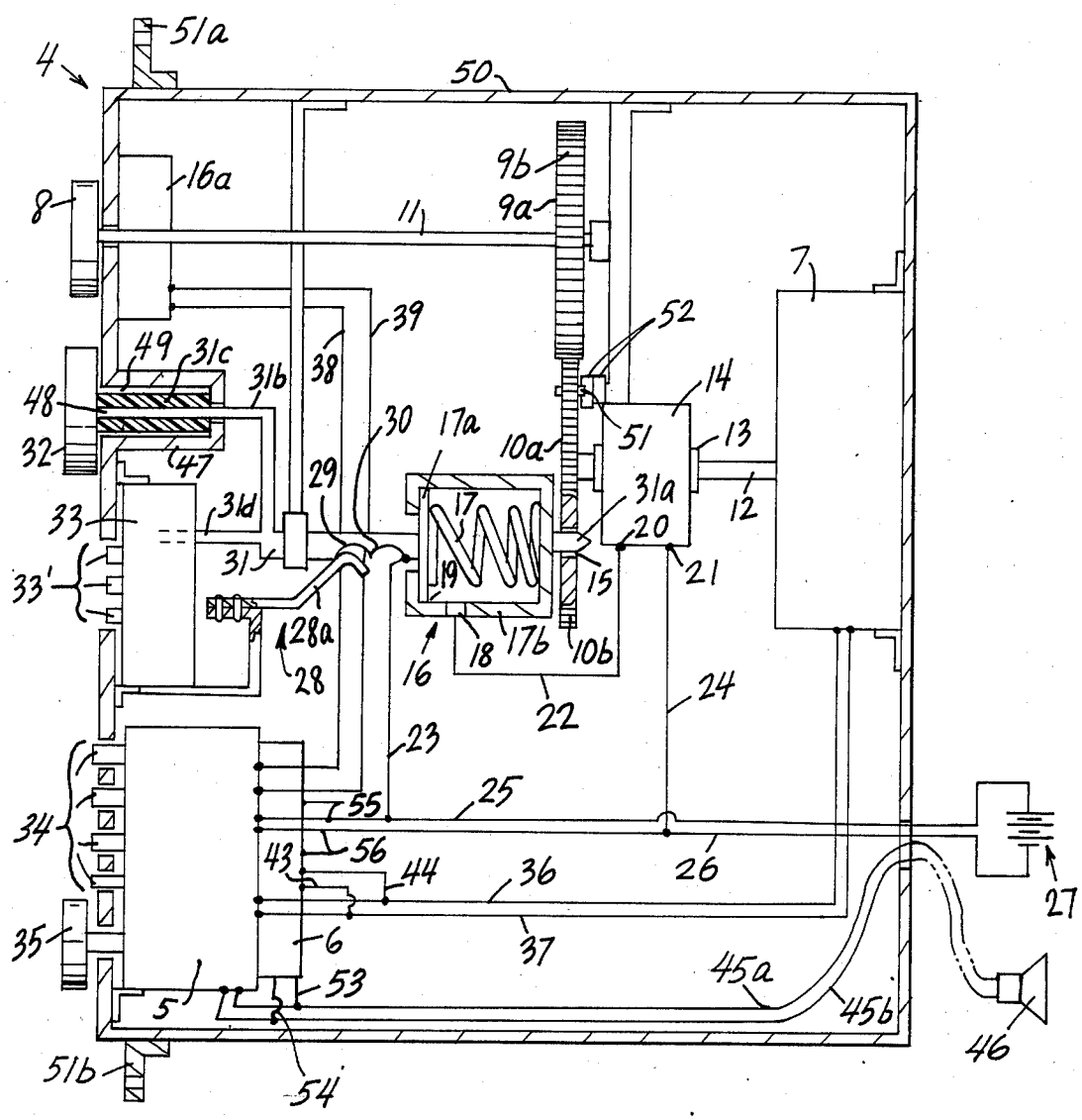
FIG. 1
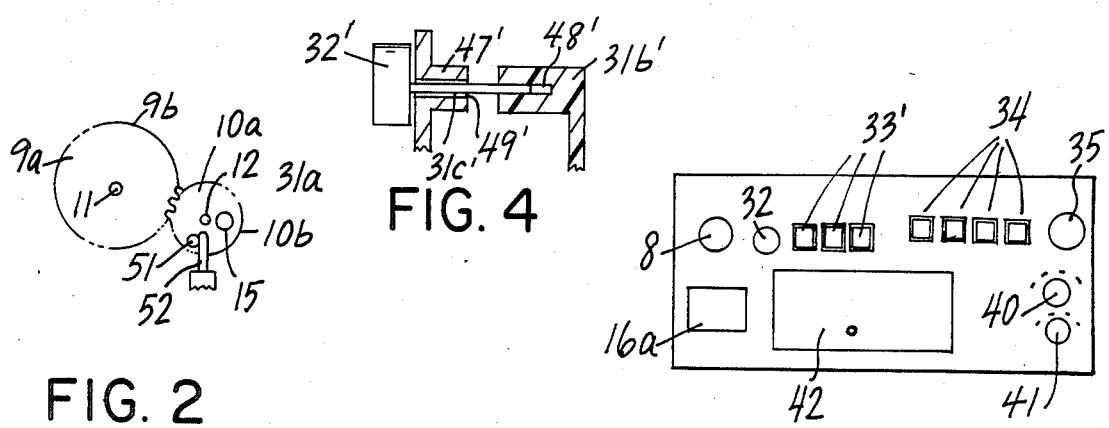
FIG. 2
FIG. 4
FIG. 3

ANTI-BURGLARY DEVICE FOR AUTOMOBILE RADIOS AND CASSETTES

This invention is directed to an anti-burglary automobile radio and/or cassette-playing unit.

BACKGROUND

Prior to the present invention, thefts of radios and/or cassette-playing units from automobiles have become notoreous because of inability to deter such thefts which have been rampant. Merely securing the same immovably into the dashboard of the auto has merely resulted in the dashboard itself being ripped-out and destroyed.

Valuable automobiles have thus been repeatedly molested, causing major damage thereto, with the thieves still proceeding to get at and remove the radios for resale thereof. The fancier the radio and/or cassette-playing unit, the greater the risk of theft from and destruction of the automobile dashboard.

Prior to the present invention, there has been no apparent effective deterrent to these malicious thefts.

THE OBJECTS

Objects of the present invention are directed to the overcoming and deterring of problems and difficulties and theft of automobile radios and/or cassette-players in the nature of those discussed above.

Another and more specific object is to obain a unit making it impossible to utilize operatively the automobile radio and/or cassette player unit even if successfully stolen in absence of destroying the unit and/or its ornamental appearance, whereby commercial resale value thereof is eliminated.

Another more specific object is obtain an inoperative radio and/or cassette-player unit rendered worthless in absence of secret knowledge, without otherwise destroying its commercial value by otherwise destruction of the unit.

Another object is to render it impossible to jam or incapacitate the safety device of this invention forcefully by abuse thereof, in absence of destroying the entire unit.

SUMMARY OF THE INVENTION

Broadly the invention may be described as an automobile anti-burglar device embodying an electronic unit and mechanism for one or more conventional and/or commercially-available and/or otherwise desired electronic function(s) which function is ineffective or inoperative in one position and state of its control levers and knows thereof, and operative in an alternate position and state of its control levers; together as a part of the basic inventive minimal combination is a dial-type combination lock unit and mechanism thereof of conventional and/or commercially-available and/or otherwise desired type having a plurality of combination dials, mounted and adapted alternately securing or locking, and unsecuring or unlocking the electronic unit in alternately its inoperative state and its operative state, such that when locked in its inoperative position and state it has no useful utility; and also together as another part of the basic inventive minimal combination, is the protective enclosure casing and its inner and outer support structure substantially totally encasing the electronic unit and the dial-type lock within encased inner space to an extent assuring that the inner parts cannot be reached in absence of destroying the casing, ornamental appearance and commercial value of the electronic unit as an item for sale or resale. Obviously there are wire holes for the electrical circuitry thereof, and lever and knob holes, and there is provided space for external access to the dials (dial wheels and/or knobs) to the combination lock. Also there is provided appropriate mechanism as required, for manual release from and alternately for the securing (locking) the lever (or its knob) in the inoperative position and state, and appropriate mechanism to adjust the electronic unit to the operative position state and/or functioning position and state when in the released or unlocked condition. The protective enclosure casing also includes outer mounting structure necessary for it to be mountable on or in an automobile dashboard.

Likewise, the electronic unit is adapted preferably to be automobile dashboard-mountable, and the electronic unit is an audio device mountable in the automobile dashboard.

The electronic unit is preferably one or both a radio and/or a cassette-player.

In a further preferred embodiment, there is a key structure(s) of one or more integrated parts, having a key located within the protective enclosing casing but having a portion of the structure extending externally of the protective casing so as to provide for a push and pull button or other equivalent lever and/or knob by which the key may be manually retracted from or inserted into it locking position and/or state. When in the locking position, the combination lock may be manually locked such as by spinning the dial(s) such that a lever cannot be moved, such as a knobbed shaft cannot be turned from its off and/or zero or inoperative position.

Preferably the lever (the term lever intended herein to encompass an equivalent rotary shaft and/or knob thereof and gears) controls volume, such that when in the no-volume or zero-volume position results in there being no discernible sound, and accordingly when locked in that position, the radio and/or cassette-player is/are rendered inoperative and having no practical utility nor commercial value. Thus, is such an embodiment, when the key is pushed (or pulled) into the locking position and state when the lever is positioned in the zero or inoperative position, the volume is locked at a position at which any sound that would otherwise be discernible with the radio and/or cassette-player activated otherwise, is totally inaudible, making the radio and/or cassette-player useless.

While the present invention can be utilized with an off and on switch, the preferred embodiment utilizes a lever and/or equivalent control (such as buttons) that control volume or some other equally critical function, such as the change-of station knob, lever, button or the like. It can, however, be readily appreciated, that with volume locked to zero, the unit can have no value, whereas off-on switches could be possibly by-passed. In contrast, the volume-control lever (or equivalent thereof) cannot be by-passed, in the absence of tearing-apart the protective casing and/or the combination lock and/or the inner working elements of the radio, such that the resale value of the unit would be substantially destroyed. Under such conditions, made by the present invention, there is eliminated any incentive to steal such units from an automobile, since the normal object of such thieves is to secure the money available upon the sale of the stolen property. Here the stolen property would have no value because no-one but the owner would know the lock's combination. Obviously, the more dials (wheels and/or levers) included as a part of the combination dial face, the more complex the combination. Even three dials, however, make available sufficient possible combinations as to make theft unpopular because of difficulty in ascertaining the combination by devious approach or guesswork.

In the above-described preferred embodiment, the outer (exterior) end of the lever or knob thereof is graspable to be typically pulled-out to remove the key from its blocking position such that thereafter the volume lever or knob thereof may be turned to the desired level of audible volume. When ready to relock, the volume lever or knob thereof may be manually adjusted to be returned to the zero or no-volume, i.e. inoperative position and state, whereupon thereafter the combination lock is actuated to be returned to its locked state.

In a further preferred embodiment, the key-lever that includes the blocking-key on the inwardly-end thereof includes at-least two joined but separable parts that are typically frictionally normally held together sufficiently to enable normal withdrawal pressure to withdraw the key from its locked position and state, if the correct lock combination has been dialed earlier, and/or to allow pressing of the outer (exterior) end of the leever or knob to cause the key to be returned to the locking position and state, after which the lock may be again returned to its locking position and state of being locked. However, the frictional fit is insufficiently binding as to prevent the pulling-off of the exterior portion from and away from the interior portion(s) of the key-lever, such that excessive pulling pressure will not destroy the combination lock nor serve to nor tend to withdraw the key from its blocking position when the combination lock is in a locked position and state.

It is likewise a preferred embodiment that prevents a ramming and jamming inwardly of the key-lever in a manner that might destroy the combination lock and/or dislodge the key from its blocking position, by virtue of the protective enclosing casing forming a recess having an inward inaccessible hole through which the key-lever extends inwardly to the lock and blocking position. Also preferred is the channel formed by the recess-shaped structure being of a small size and arrangement preventing the use of tweezers and/or pliers to grasp and pull-out on an inner portion of the key lever, and to prevent the use of a screw driver or equivalent probe to destroy inner lock and/or blocking-key arrangement and function(s) thereof. In effecting this, the recess channel has a diameter no larger than the portion of the key lever extending therethrough, preferably. Likewise, the key lever is made of preferably wedge-mated male and female portions and in a further preferred embodiment, the outer-most portion of the key lever is the female portion and the channel diameter is almost identical to the outside diameter of the female portion, the channel diameter thus being defined as being only fractionally larger, suffiently large for insertion and rotation and/or pulling and pushing through the channel, but no larger than necessary for such function thereof; in this embodiment, the inner-most portion is obviously the male member. In another preferred embodiment in which the outer-most portion of the key lever is the male portion, the male member and the channel and the hole at the inner end of the channel each are almost of identical diameter, the channel and hole being only fractionally larger than the outer diameter of the male member/portion of the key lever, and in this embodiment, the inner portion obviously being the female member. The manner by which these preferred arrangement serve to further prevent bypassing the combination lock and/or the blocking key, will be better understood when described below with reference to the Figures.

Also, preferably the length of the male and/or female member utilized as the outer-most portion of the key-lever, is preferably sufficiently short as to prevent jamming it through the recess inner-end hole and destroying the function of the lock and/or disengaging the key from its blocking position and state when in the locked state.

In another preferred embodiment, as an integral part of the key-lever which key-lever is in the nature of two spaced-apart shaft portions, the shaft portions are interconnected by a spring device having opposing mating structures biased apart by a spring, typically a coil spring. Thereby, the key-lever (shaft) may be pressed inwardly in a direction that normally would insert the key into the blocking position and state, but whch if the volume lever has not yet been returned to zero-volume position so as to align its key-receiving structure and aperture thereof, presses the key against volume lever (or an element thereof, such as a gear) while the spring thereby becomes compressed as the opposing mating structures are forced closer together, i.e. the spring device makes the key lever compressible. Thereafter, when the volume lever is returned to the inoperative position and state of zero volume, the key promptly slips into its blocking position and state, preventing. the volume from being turned-up until withdrawal of the key by pulling-out (typically) of the key-lever.

In a still further preferred embodiment, there is provided a switch and circuitry therefor connected with an electromagnet mounted in association with typically the volume lever or some portion of its mechanism such as a gear thereof having the aperture therein as a part of the key-receiving structure, actuation of the electromagnet causes the volume lever or gear thereof to return to the zero-volume position and state. Such actuation is by way of closing of electrical contacts by pressing inwardly (typically) the key-lever (typically a shaft) in a direction that normally would insert the key into the aperture of the key-receiving structure. Accordingly, whenever the volume lever (shaft) has not been readjusted to the position of zero-volume at the time of pressing inwardly (typically) the key-lever (shaft), the key becomes instantaneously inserted into its blocking state, ready for the final locking of the lock. It is to be understood that an obvious variation would be for the pressing inwardly of the key-lever to also simultaneously cause the combination lock to become again locked, as the key is inserted simultaneously into the aperture of the key-receiving structure and as the volume lever (or gear thereof carrying the key-receiving structure's aperture, is returned to the zero-volume position.

In a further preferred embodiment, in order to make certain that the key-lever is fully properly extended (pulled-out) to withdraw the key from its blocking position, and likewise to make certain that the key-lever is fully pressed-in to a position where the key will be or will become fully inserted to its blocking position and state, there is provided in association with the key-lever a toggle type arrangement tending to bias the lever toward alternately either pressed inward position or pulled-out position. A typical arrangement is illustrated in the drawings.

The invention may be better understood by making reference to the following Figures.

THE FIGURES

FIG. 1 illustrates graphically and diagrammatically, in top and partial cross-sectional view with blocks representing particular conventional elements and/or units, the inventive encased radio and cassette-player with combination lock thereof lockable of the volume control into the zero-volume inoperative state and position, and further illustrating preferred features.

FIG. 2 illustrates graphically and diagrammatically, a typical in-part view of preferred key-lever gears and inclusive of the key-receiving structure and aperture formed thereby having the key received therein, in an elevation plan view thereof with the key in cross-section.

FIG. 3 illustrates graphically and diagrammatically, a typical view of a front face of the inventive encased radio and cassette-player of FIG. 1.

FIG. 4 illustrates graphically and diagrammatically, an alternate preferred embodiment of the key-lever, in in-part view, for the inventive encased radio and cassette-player of FIG. 1.

DETAILED DESCRIPTION

The FIG. 1 illustrates the inventive encased radio and cassette-player 4 having its integral parts as follow. There is shown mounted on an inner wall of the protective casing 50 its mounting brackets 51 and 51b, and the radio 5 (shown in block), the cassette-player 6 (shown in block), the volume-control unit 7 (shown in block), the volume control knob 8 on volume control shaft 11 that revolves volume control gear 9a having its teeth 9b meshed with teeth 10b of volume control gear 10a that includes the key-receiving structure forming the key-receiving aperture 15 with the key 31a inserted therein in the blocking position preventing the turning of the gears 10a and 9a and accordingly preventing the revolving of the shaft 11 and its knob 8, when turned to the zero-volume position and state. When the key 31a is withdrawn from the aperture 15, the knob 8 may be revolved to a volume at which audio sound is discernible to the ear, by causing the shaft 12 to be revolved to turn-up volume of the volume unit 7. Mounted and anchored on shaft 12 or on some other equivalent shaft, is a magnetizable structure or material 13, around which is an electromagnet 14 in the nature of a motor-arrangement such that energizing of the electromagnet causes the shaft to revolve in a direction that returns the gears 10a and 9a and the knob 8 to the zero-volume position and state, if and when prior thereto the volume earlier had been turned to an audible position and state. Typically if the volume knob is not at the zero position, the switch contacts 18 and 19 are brought together to close the electrical circuit of the electromagnet by virtue of the contact 19 mounted on key-lever spring device-opposing structure 17a being pressed toward contact 18 mounted on sidewall 17b of the other spring device-opposing structure when the key-lever is pushed inwardly, the key lever being composed collectively of the knob 32, the female member 31c, the male member 31b, the main structure key-lever structure 31, its key-lever lock-engaging structure 31d, the spring device 16, and the key 31a. The contacts are brought together because the key 31a presses against the face of the gear 10a (not being aligned with the aperture 15) causing the spring 17 to become compressed, when the knob 32 is pressed inwardly and when the knob 8 has not yet been returned to the zero-volume position. Circuit lead 22 connects electrical contacts 18 and 20. Circuit lead 24 connects electrical contact 21 with electrical lead 26 which is one of the power leads from the radio 5 and cassette play 6, the other power lead being power lead 25. Lead 23 connects electrical contact 19 to the lead 25. A battery power-source is represented by battery 27. Holding resiliently the main body key-lever portion 31 in its pushed-in position and state as illustrated, is the toggle-like spring 28 having its portion 28a in depression 29; when the knob 32 is pulled-outwardly, the spring portion 28a slips over the dividing hump and presses and slips retainingly into the depression 30. The spring 28 is mounted indirectly on the inside face of the protective casing, but may be mounted on other appropriate support structure. The dials 33' of the combination lock 33 must be dialed according to the particular combination of that lock, and after correctly dialing the proper combination, the knob 32 may be pulled outwardly to thereby withdraw the key 31a from the blocking position in the aperture 15 of the gear 10a, thereafter allowing the knob 8 to be turned to turn-up the volume. Radio buttons 34 or any other equivalent radio controls are herein represented as merely symbolic. Likewise, the tuner knob 35 is only symbolic of any of various knobs that conventionally may be a part of a particular radio, the invention not being in the particular type of radio nor knobs thereof, apart from the invention as described. Electrical leads 38 and 39 are symbolic of circuitry leading from the radio to typical a digital monitor 16a that exhibits the particular station number being tuner-in at the moment.

FIG. 2 illustrates an elevation plan view in a part view of the mechanism and with cross-section of the shafts 11 and 12 and of the key 31a, exhibiting the typical relationship of the gears 9a and 10a having teeth 9b and 10b, and of the hole 15 and the key positioned therein, and of the stop-key 51 mounted on gear 10a (typically) and the abutment 52 against which the stop-key 51 abuts when the knob is returned to or positioned at the zero-volume or inoperative position and state, this stop-key 51 and the support structure-mounted abutment 52 being also shown in the FIG. 1. This Figure also illustrates typically intermeshing teeth 9b and 10b of the wheels, each being drivable of the other thereby.

FIG. 3 illustrates a typical front face appearance of the inventive unit of FIG. 1 as already described. The knobs 40 and 41 symbolically represent a plurality of knobs or the like that normally would be functionally associated with the conventional or desired cassette-player 6 having typical front-lid 42. In FIG. 1, there is shown symbolic and diagramatic electrical leads 43 and 44 leading to the volume-control leads 36 and 37, and likewise electrical leads 53 and 54 leading to the speaker leads 45a and 45b, and likewise the power leads 55 and 56. Also symbolically shown is speaker 46 diagrammatic of one or more speaker appropriately connected and mounted.

FIG. 4 illustrates diagramattically and symbolically an alternate embodiment shown in-part, of the key lever, here designated (in so far as its component parts are shown) as knob 32', pull-push male-member shaft 31c', channel (space) 49', channel-defining walls (recess walls) 47' (analagous to FIG. 1 recess-forming walls 47), female mated member 31b' having female channel space 48' into which the male-member shaft 31c' is frictionally mated.

While other locks such as key-actuated locks and/or computer-card locks or the like might ordinarily be considered to be mechanical equivalents or otherwise equivalents to a combination mechanical lock of this invnetion, such is not the case for the present invention, the combination being critically the only type lock that is employable, because it is not readily possible to by-pass such a lock. On the other hand, a key actuated lock can normally be easily and rapidly picked. A computer-card that is inserted to actuated circuits often can be bypassed by manually fouling the card reading circuitry inside the card-insertion slot, to cause a fouling of electrical circuits or the like which would serve to effectively bypass the lock, causing release of the blocked lever and/or gear thereof.

Thus, for the present invention, there is no substitute for the combination lock, because to do so would defeat the utility of the invention.

Otherwise, within the spirit of the invention, it is possible to make such variations and substitution of equivalents as would be apparent to a person of ordinary skill in this technology.

I claim:

1. An anti-burglary device comprising in combination: a dashboard-mountable audio electronic means for an electronic audio function including reproducing cassette or radio audio sound, said audio electronic means including audio elements adapted to reproduce audio sound; a lever means for intermittent alternate switching from an inoperative position for said electronic function to an alternate operative position required to achieve said electronic function, said lever means including an interior inaccessible portion connected to an accessible exterior manual manipulation portion arranged to make possible manual movement of the interior inaccessible portion; a dial-type combination lock means for securing and unsecuring said lever means at said inoperative position at which said electronic function cannot be achieved, said dial-type lock means having locking elements having dials adapted for dialing said locking means to and from alternate unlocked and locked positions, said dial-type lock means being additionally for manual movement alternately from and to release and securing of the lever means in said inoperative position when said dials have been dialed to said unlocked position; and durable protective enclosure means for structurally substantially enclosing protectively each of said electronic means and said dial-type lock means and said interior inaccessible portion of said lever means such that the enclosed said electronic means and the enclosed said dial-type lock means and the enclosed said interior inaccessible portion are inaccessible and protectively shielded from access and from by-passing of the dial-type lock means from an exterior space and such that said dials and said manipulation portion are each accessible from an exterior of said enclosure means, and such that when the anti-burglary device is in locked positions, it being impossible to utilize operatively the lever means and the audio electronic means in absence of physically destroying the audio electronic means in an effort to gain access thereto through its enclosure means; and mounting means for mounting the electronic means within said enclosure means and for mounting the enclosure means within or on an automobile dashboard.

2. An anti-burglary device according to claim 1, in which said electronic means includes a radio.

3. An anti-burglary device according to claim 2, in which said electronic means further includes an audio-cassette player.

4. An anti-burglary device according to claim 3, in which said interior inaccessible portion of the lever means includes a key receiving structure positioned and adapted to receive or have withdrawn therefrom a blocking-key means, and in which said dial-type lock means further includes an accessible blocking-key means for manually-moving blocking elements to and from blocking and non-blocking positions when said dials are dialed to said unlocked position, such that when said blocking key means is in a received position relative to said key-receiving structure, said lever means is secured in said inoperative position; and handle means including a handle structure of which at-least a graspable portion thereof is accessible from an exterior of said enclosure means, and said handle structure being connected to and movable of said blocking key means alternately to and from said key-receiving structure's said blocking position.

5. An anti-burglary device according to claim 4, in which said blocking-key means includes a key receivable into said space which is formed by said key-receiving structure in said inoperative position and withdrawable therefrom by manipulation of said handle and in which said blocking key means includes a spring means connected to said key and located and connected sufficiently to transmit withdrawal and inserting forces transmitted between said handle and said key, said spring means biasing said key toward said lever means sufficiently to bias the key into said space of said key-receiving structure in said inoperative position when said lever means is positioned in said inoperative position.

6. An anti-burglary device according to claim 1, including alternate-position biasing means mounted on said enclosure means adapted for biasing said lock means in one of alternate securing and non-securing positions when said lever means is in one of said inoperative and operative positions respectively.

7. An anti-burglary device according to claim 1, including electromagnetic means for returning said lever means to said inorperative position, said electromagnetic means including an electromagnet and circuitry therefor adapted to be connectable to contacts of a direct electrical current source, said lever means including magnetizable matter responsive to magnetic forces adapted to return said lever means to said inoperative position when said circuitry is in an energized state, and said circuitry including switch contacts adapted to close electrical circuitry when said lock means is a securing position and to break electrical circuitry when said lock means is in a non-securing position.

8. An anti-burglary device comprising in combination: a dashboard-mountable dashboard-mountable audio electronic means for an electronic audio function including reproducing cassette or radio audio sound, said audio electronic means including a radio and an audio-cassette player; a lever means for intermittent alternate switching from an inoperative position for said electronic function to an alternate operative position required to achieve said electronic function, said lever means including an interior inaccessible portion connected to an accessible exterior manual manipulation portion arranged to make possible manual movement of the interior inaccessible portion, said interior inaccessible portion of the lever means including a key-receiving structure positioned and adapted to receive or have withdrawn therefrom a blocking-key means; a dial-type combination lock means for securing and unsecuring said lever means at said inoperative position at which said electronic function cannot be achieved, said dial-type lock means having locking elements having dials adapted for dialing said locking means to and from alternate unlocked and locked positions, said dial-type lock means being additionally for manual movement alternately from and to release and securing of the lever means in said inoperative position when said dials have been dialed to said unlocked position, said dial-type lock means further including an accessible blocking-key means for manually-moving blocking elements to and from blocking and non-blocking positions when said dials are dialed to said unlocked position, handle means including a handle structure of which at-least a graspable portion thereof is accessible from an exterior of said enclosure means, and said handle structure being connected to and movable of said blocking key means alternately to and from said key-receiving structure's said blocking position; said blocking means including at-least two separate first and second elements in a wedge-fit secured together sufficiently securely and adapted such that the blocking-key means may be moved to and from blocking and non-blocking positions by operation by said handle, but adapted such that excessive pressure on the handle result in frictional slippage of the wedge fit sufficiently to prevent disruptive damage to or by-passing of the dial-type lock means, the blocking-key means or the lever means, such that when said blocking key means is in a received position relative to said key-receiving structure, said lever means is secured in said inoperative position; and durable protective enclosure means for structurally substantially enclosing protectively each of said electronic means and said dial-type lock means and said interior inaccessible portion of said lever means such that the enclosed said electronic means and the enclosed said dial-type lock means and the enclosed said interior inaccessible portion are inaccessible and protectively shielded from access and from by-passing of the dial-type lock means from an exterior space and such that said dials and said manipulation portion are each accessible from an exterior of said enclosure means, and such that when the anti-burglary device is in a locked in inoperative positions, it being impossible to utilize operatively the lever means an the audio electronic means in absence of physically destroying the audio electronic means in an effort to gain access thereto through its enclosure means; and mounting means for mounting the electronic means within said enclosure means within or on an automobile dashboard.

9. An anti-burglary device according to claim 8, in which said key-receiving structure includes space-forming structure forming a space, and in which said blocking means includes a key adapted to be receivable into said space in said operative position and adapted to be withdrawable therefrom by manual manipulation of said handle, and in which said blocking-key means further includes a spring means connected to said key located between and connected sufficiently to transmit withdrawal and inserting forces transmitted between said handle and said key, said spring means biasing said key toward said lever means sufficiently to bias the key into said space when said key-receiving structure is in said inoperative position.

10. An anti-burglary device according to claim 9, including alternate-position biasing means mounted on said enclosure means adapted for biasing said blocking-key means in one of alternate withdrawn and inserted positions before or after manual operation by said handle.

11. An anti-burglary device according to claim 10, including electromagnetic means for returning said lever means to said position of inoperativeness at which said key is insertable into said space, said electromagnetic means including an electromagnet and circuitry therefor adapted to be connectable to a direct current electricity contacts of an electrical source, said lever means including magnetizable matter responsive to magnetic forces adapted such that the lever means is returnable to said inoperative position and state when the electromagnet is in an energized state, and said circuitry including switch contacts mounted and adapted to make or break circuit when manual manipulation of the handle causes said key to become withdrawn from said key-receiving structure and to break contact and a de-energized circuit when manual manipulation of the handle causes said key to become inserted into a locking position of said key-receiving structure within the space thereof.

12. An anti-burglary device according to claim 8, in which said first element and said second elements mate, an outer-most one of said first and second elements being one of a female member and a male member and being an attached part of said handle, and the inner-most remaining other one of said first and second elements being a remaining one of said male member and female member, and in which said enclosure means has structure thereof forming a recess structure and channel thereof of predetermined diameter of dimension larger than the outer-most one, and said recess structure forming a hole at an inner end of said channel and the hole being of diameter larger than a diameter of said male member, and said handle including a knob of a size greater than said channel such that the knob limits distance that said outer-most one may be pressed inwardly within said channel such that portions accessible to each other of the male and the female members is substantially less than channel depth of said female member whereby inward force on said outer-most one is prevented from jamming the inner-most remaining other one.

13. An anti-burglary device according to claim 12, in which said outer-most one is said female member and said hole has a diameter larger than said male member.

14. An anti-burglary device according to claim 12, in which said outer-most one is said male member and said channel and said hole each are larger than said male member, and in which said inner-most one is said female member.

* * * * *